United States Patent [19]

Newton

[11] Patent Number: 5,037,244
[45] Date of Patent: Aug. 6, 1991

[54] AIR POWERED CAN CONVEYANCE SYSTEM

[76] Inventor: Stanley L. Newton, 203 Benson Junction Rd., DeBary, Fla. 32713

[21] Appl. No.: 273,884

[22] Filed: Nov. 18, 1988

[51] Int. Cl.⁵ .................................................. B65G 51/00
[52] U.S. Cl. ......................................... 406/86; 406/88
[58] Field of Search ................................ 406/86–89; 198/398; 193/44

[56] References Cited

U.S. PATENT DOCUMENTS

| | | |
|---|---|---|
| 2,781,232 | 2/1957 | Smith . |
| 3,622,151 | 11/1971 | Range . |
| 3,685,632 | 8/1970 | Brady . |
| 4,369,005 | 1/1983 | Lenhart ................................ 406/88 |
| 4,500,229 | 2/1985 | Cole et al. .......................... 406/88 |

Primary Examiner—Sherman Basinger
Assistant Examiner—Stephen P. Avila
Attorney, Agent, or Firm—Malin, Haley, McHale Dimaggio & Crosby

[57] ABSTRACT

The disclosure relates to a conveyor system wherein an article being transported on the conveyor system has its orientation changed from a vertical position at its point of entry to a horizontal position at its point of discharge. The orientation occurs through the use of air power jets which are appropriately located to assist in the re-orientation of the article being transported. The re-orientation occurs without any reduction in conveyor speed and in fact, results in a thirty-three to seventy-five percent increase in overall capacity. Additionally, the system is adjustable in that it can receive different sizes cans.

41 Claims, 2 Drawing Sheets

AIR POWERED CAN CONVEYANCE SYSTEM

BACKGROUND OF THE INVENTION

The invention relates to an air powered conveyor system wherein the cans or articles are moved along the conveyor system through the use of air powered jets. Historically, most conveyor systems have relied on belts or chains to move the articles along their way in a conventional conveyor system.

However, belts and chains are subject to breaking, stretching and/or jamming of the articles being conveyed. In recent years, air power systems have been developed whereby air pressure is utilized to move the articles along the conveyor system from one station to another. As the articles move along the conveyor system, a point is reached wherein the article is required to be changed from a vertical orientation to a horizontal orientation or vice versa. The use of a gravity spiral has been attempted however, it cannot maintain the speed of the remainder of the system and as a result frequent jamming occurs. As one would expect, the jamming of a conveyor system requires that the entire line be shut down until the jam is cleared. This can be an expensive delay in terms of lost production and man hours required to clear the jam. Additionally, the frequency of the jam compounds the problem and likewise increases the overall cost.

SUMMARY OF THE INVENTION

It was with this knowledge in mind that applicants were motivated to design a conveyor segment which is readily adaptable to known air power conveyor systems and also conventional systems and would successfully make the desired ninety degree change i.e. from vertical to horizontal or horizontal to vertical, whichever is required. The outstanding feature of the instant invention is the fact that within a linear distance of only five feet, it can change the orientation of a can, from vertical to horizontal, or vice versa while maintaining full line speed of approximately thirty-six hundred cans per minute without jamming as in prior art systems.

OBJECTS OF THE INVENTION

An object of the invention is the provision of an air power conveyor segment which can make an article orientation of ninety degrees within a relatively short distance.

Another object of the invention is the provision of a novel jet plate in an air powered conveyor system which permits very high feed rates.

Yet another object of the invention is the provision of an air powered conveyor segment which feeds articles with a minimum of jamming.

A still further object of the invention is the provision of a butterfly control for maintaining the air infeed at an optimum pressure in the air plenum.

A further object of the invention is the provision of a plurality of wear strips which are mounted on the conveyor system to reduce friction and assist the article being conveyed in moving along rapidly.

Yet another object of the invention is the provision of adjustment means whereby the conveyor segment can accommodate cans or like articles of twelve ounce or sixteen ounce capacity.

A still further object of the invention is the provision of an air powered conveyor twist segment which is readily adaptable to other known conveyor systems.

These and other objects of the instant invention will become more apparent hereinafter. The instant invention will now be described with particular reference to the accompanying drawings which form a part of this specification wherein like reference characters designate the corresponding parts in the several views.

DETAILED DESCRIPTION OF THE DRAWINGS

Figure 1:
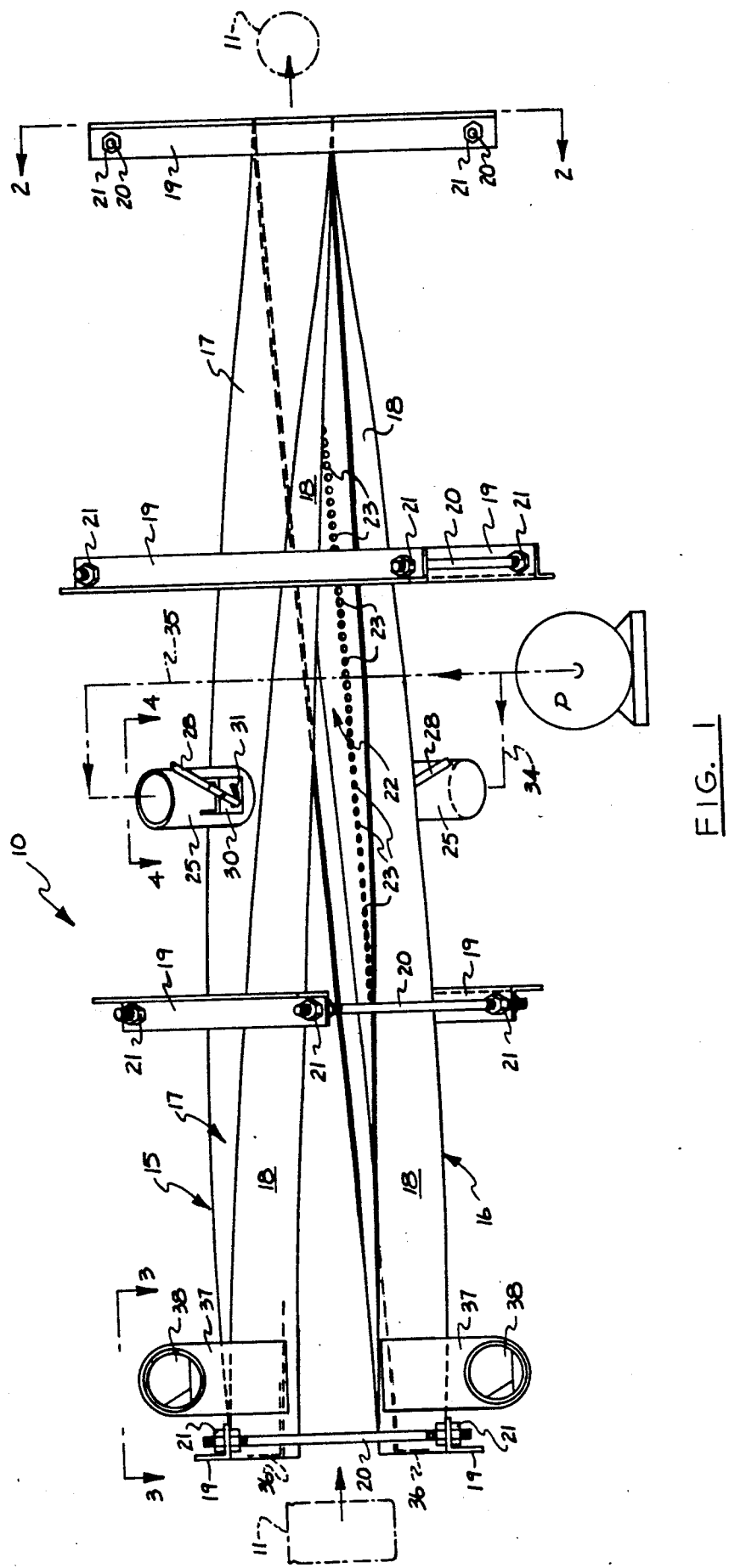
FIG. 1 is a side view of the novel air power twist conveyor segment.

Referring now to FIG. 1, there is illustrated the novel air power twist conveyor segment generally indicated by reference numeral 10. As indicated in FIG. 1, a can 11, or like article, is fed into the conveyor segment 10 in a vertical orientation at the left end thereof and due to the novel air power twist, emerges at the right most end thereof in a horizontal orientation, a ninety degree re-orientation has taken place in its travel incrementally through the air power twist conveyor segment 10.

The air power twist conveyor segment 10, although only a relatively short conveyor component, executes the ninety degree re-orientation in a distance of five linear feet. Air power twist conveyor segment 10 comprises an upper can guiding and transporting member 15 and a lower can guiding and transporting member 16. Upper can guiding and transporting member 15 includes an inverted channel or U-shaped member with the open end facing downward. Top portion 17 and sides 18 form transporting member 15. As can be seen from FIG. 1, upper can guiding and transporting member 15 is gradually twisted whereby its rightmost end is oriented such that its open end is facing into the paper since there has been a ninety degree twist placed into members 15 and 16.

FIG. 1 also illustrates the bracing and supporting structure which is required to give upper and lower members 15 and 16 the ninety degree twist and permanently hold members 15 and 16 at their required distance apart as well as the amount of incremental twist. Supporting angle members 19, a pair of which is securely attached as by weld to each end of twist segment 10 with two additional pairs of supporting angle members 19 being appropriately spaced therebetween. Each pair of supporting angle members 19 is fixed a given distance from the other by a pair of adjusting screws 20. When upper and lower guide members 15 and 16 are set at their desired location, nuts 21, above and below the flange of supporting angle member 19 are tightened to ensure that the desired distance will be maintained.

It is to be noted that there will be other supporting structure (not shown) which will be used to support air power twist conveyor segment 10 with respect to the floor and also bring it into proper alignment with the remainder of a conveyor system which it is being used with.

Figure 2:
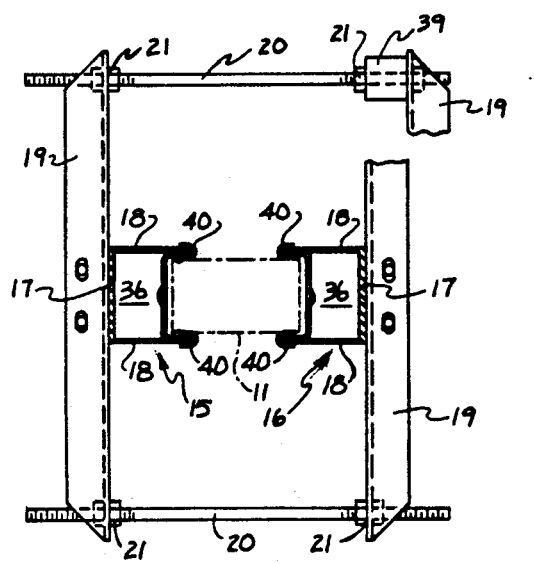
FIG. 2 is an end view of the discharge end looking in the direction of arrows 2—2 of FIG. 1.

Illustrated in the central portion of lower guide 16 is et plate 22 which extends the full length of each of upper and lower guides, 15 and 16. Jet plate 22 is provided with a plurality of spaced louver punches 23, which can better be seen in FIG. 6. However, jet plate 22 is also U-shaped and fits into upper and lower guide members 15 and 16 with the edges of the downwardly extending legs being flush with the downwardly extending legs of upper and lower guides 15 and 16. Jet plate 22 is welded to the legs of upper and lower guide members 15 and 16, thus forming an air plenum chamber 24 therewith, as shown in FIG. 2. Connected to the outer surface of each top portion 17 is air inlet tube 25 which serves as support for butterfly valve 26 and its adjusting mechanism 27 which includes a handle 28 operably connected to rotatable shaft 29 to which butterfly valve 26 is securely attached. Mounting bracket 30 projects outwardly from air inlet tube 25 to provide rotating clearance for handle 28. Mounting bracket 30 is provided with an arcuate slot 31 through which locking pin 32 extends and is provided with a locking nut 33 for locking handle 28 and butterfly valve 26 in its desired position and control the amount of air flowing therethrough. Schematically shown in FIG. 2 is a centrifugal blower P, the discharge of which, flows through air lines 34 and 35 supplying air to both upper and lower air inlet tubes 25 to feed air plenum chambers 24 in upper and lower guide members 15 and 16. It is to be noted that both ends of each plenum chamber 24 are provided with end caps 36 to prevent escape of air.

Looking at the rightmost end of FIG. 1, one can readily see that the ninety degree twist of upper and lower guide members 15 and 16 has been completed since top portion 17 which was positioned on top at the leftmost end of FIG. 1 is now positioned on its side, a change of ninety degrees.

Referring again to the left hand portion of FIG. 1 there is also shown a pair gauge brackets 37 which are attached to sides 18 and provide a mount for a pair of Minihelic II gauges 38 which provide an indication of pressure within air plenum chamber 24. An ideal reading on these gauges 38 would be approximately three to five inches of static pressure to provide optimum operation.

Referring now to FIG. 2, there is illustrated an end view of air power twist segment 10 as indicated by arrows 2-2 of FIG. 1. As seen in this view, the air power twist segment 10 has undergone a ninety degree twist and can 11, shown in dashed lines, emerges in a horizontal orientation. FIG. 2 also clearly shows end caps 36 which cap off the ends of air plenum chamber 24. As illustrated, FIG. 2, has been adjusted for conveyance of a five inch or twelve ounce can 11. However, the air power twist segment is adjustable to the extent that it is capable of also handling six and seven sixteenth inch or sixteen ounce cans. As illustrated in the uppermost portion of FIG. 2, adjusting screws 20 are sufficiently long to receive a spacer sleeve 39 which has the effect of moving supporting angle member 19 and the lower guide member 16 to the right a sufficient distance to accommodate the larger sixteen ounce can. Although this adjustment feature is only shown with respect to one adjusting screw 20, however, should the air power twist segment 10 be desired to be changed to accommodate sixteen ounce cans, each adjusting screw 20 would be provided with a spacer 39 to increase the space required for a sixteen ounce can. FIG. 2 also illustrates wear strips 40 which are clipped onto the downturned flanges of sides 18 and jet plate 22. Wear strips 40 are made of ultra high molecular plastic material and the main purpose of using these strips 40 is to prevent scratching or marring of the cans as they pass through air power twist segment 10. It is to be noted that the cans passing through conveyor segment 10 are bright unflanged cans which are open at the top. By the word "bright" is meant aluminum cans without any print labeling thereon.

Figure 3:
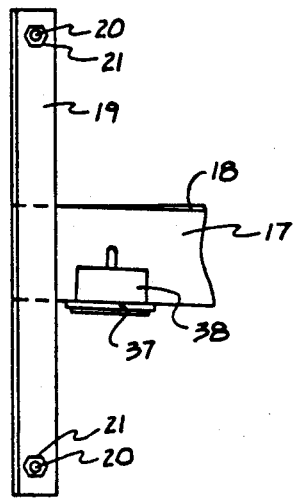
FIG. 3 is a plan view looking in the direction of arrows 3—3 of FIG. 1 showing the mounting bracket for the gauge.

Referring now to FIG. 3, there is illustrated a top view of bracket 37 and gauge 38 as it is mounted on top portion 17 of upper guide 15. The same mounting arrangement is shown in FIG. 1 for gauge 38 with respect to lower guide 16.

Figure 4:
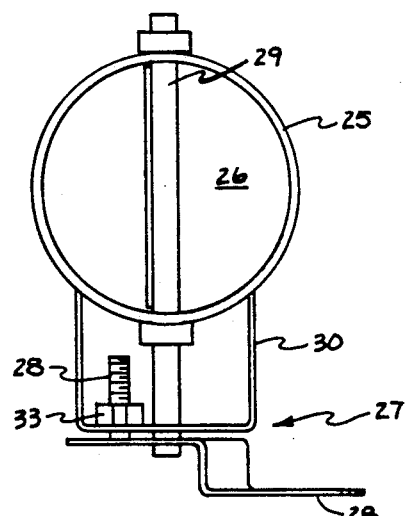
FIG. 4 is a plan view looking in the direction of arrows 4—4 of FIG. 1 showing the mounting of the butterfly valve.

Referring now to FIG. 4, there is an illustration of the mounting of butterfly valve 26 in an inlet tube 25 and the locking pin 32 and nut 33 for locking butterfly valve 26 in its desired position to control the flow of air into air plenum chamber 24.

Figure 5:
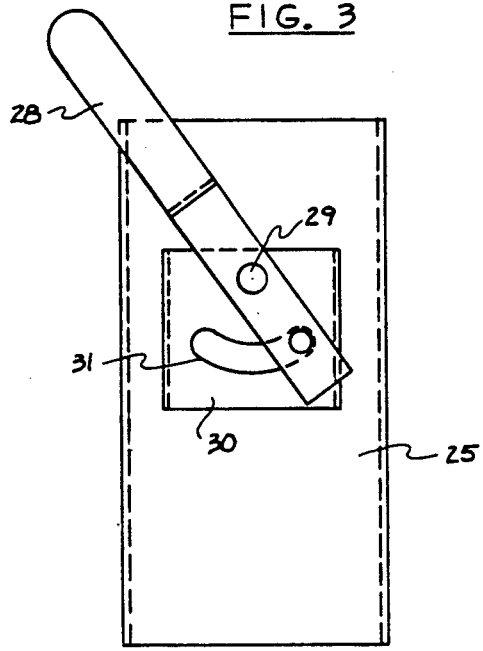
FIG. 5 is a front view of the butterfly valve assembly looking in the direction of the arrows 5—5 in FIG. 1 showing the valve adjustment lever.

FIG. 5 is a front view of air inlet tube 25 showing the arcuate slot 31 which locking pin 32 slides in to make an adjustment to butterfly valve 26.

Figure 6:
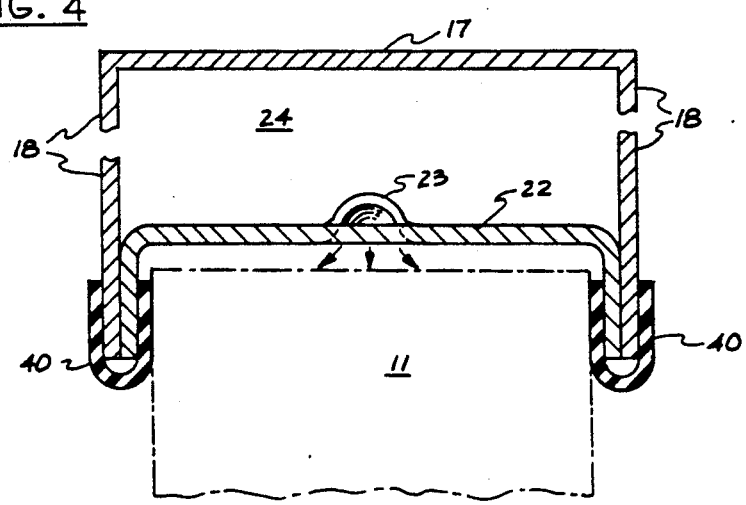
FIG. 6 is a cross-sectional view of the jet plate illustrating the air scoop, wear strips, and air plenum chamber.

FIG. 6 is an enlarged view, approximately full scale, of jet plate 22 showing its relationship to air plenum chamber 24. Louver punches 23 are also shown and serve as air inlets into the area where cans 11 are being conveyed. The arrows indicate the flow of air exiting from air plenum chamber 24 through louver punches 23 into the can area. As can be seen, wear strips 40 are in engagement with cans 11 and due to the properties of wear strips 40, and the presence of controlled air pressure, the cans move speedily along segment 10 without jamming.

Again, it must be kept in mind that both upper guide 15 and lower guide 16 are provided with identical air plenum chambers 24 and jet plates 22, thus the air is fed to both the top and bottom of the can 11 as it passes through air power twist segment 10.

As indicated above, air power twist segment 10. If, for some reason, a can should be in some orientation, other than vertical alignment with upper guide 15 and lower guide 16, the can is automatically ejected from conveyor segment 10 through the "gap" which exists between upper and lower guides 15 and 16. The air exiting upper and lower jet plates 22 assists in removing the can without a jam occurring, as would be the case with a conventional conveyor system. It has application with both conventional conveyor systems as well as air powered systems. It also has applications in canning systems where cans or like articles are subsequently filled with products such as beer, soda, or the like, in addition to conveyor systems used in the manufacture of cans, or like articles per se. It is to be noted that although the subject invention has been disclosed as providing a conveyor segment 10 with a ninety degree twist, the inventive concept is equally applicable to segments wherein the desired twist is something less than ninety degrees. For example, twists of thirty, forty-five, sixty and seventy-five degrees are examples which might commonly be used. However, this list is not to be construed as the only possibilities. The range of angles possible in the twist is from one to ninety degrees.

While the invention has been described in its preferred embodiment, it is to be understood that the words which have been used are words of description rather than limitation and that changes may be made within the purview of the appended claims without departing from the full scope or spirit of the invention.

Having thus described my invention, I claim:

1. An air power conveyor segment comprising opposed upper and lower article supporting and guiding means; each of said upper and lower article supporting and guiding means having air plenum means for receiving air from a source of pressure; jet plate means cooperating with said air plenum means to provide an air cushion to the cans or like articles being transported therein; pressure indicating and control means operably connected to said air plenum means for controlling the pressure therein; friction reducing means operably connected to portions of said air plenum means and said jet plate means; each of said upper and lower article supporting and guiding means being provided with an incremental twist sufficient to cause an article which is received therebetween to be reoriented ninety degrees while passing through said air power conveyor segment.

2. An air power conveyor segment of the character defined in claim 1 wherein said article supporting and guiding means further includes adjustment means for adjusting the distance between said upper and lower article supporting and guiding means whereby cans of different sizes can be accommodated.

3. An air power conveyor segment of the character defined in claim 1, wherein said air plenum means comprises a longitudinally extending chamber; cap enclosure means at each end of said air plenum means for confining the air therein and an air tube inlet means attached to said air plenum means for supplying air pressure thereto.

4. An air power conveyor segment of the character defined in claim 3 wherein said control means comprises a butterfly valve operably positioned in said air tube inlet means and rotatable handle means for positioning said butterfly valve in its desired position to regulate the flow of air therethrough.

5. An air power conveyor segment of the character defined in claim 1 wherein said pressure indicating means comprises a pressure gauge operably connected to said air plenum means to provide a reading of the pressure therein.

6. An air power conveyor segment of the character defined in claim 1 wherein said friction reducing means comprises wear strips with friction reducing properties to assist the movement of the cans and also prevent marring or scratching of the surfaces of the cans.

7. An air power conveyor segment of the character defined in claim 1 wherein said jet plate means comprises a generally U-shaped member operably attached to said air plenum means; said jet plate means having a plurality of spaced louver punches forming openings through said jet plate means whereby air can exit from said air plenum means into the vicinity of the cans passing through said conveyor segment.

8. An air power conveyor segment of the character defined in claim 7 wherein said louver punches are centrally located in the base portion of said U-shaped member and extend the full length thereof with said louver punches extending into said air plenum means and acting as air scoops directing the air into the vicinity of the cans passing through said conveyor segment.

9. An air power conveyor segment comprising upper and lower article supporting and guiding means each of said upper and lower article supporting and guiding means having; air plenum means cooperating with jet plate means for providing said support and guidance to articles passing therethrough; pressure supply and control means for maintaining a predetermined pressure in said air plenum means and friction reducing means operatively connected to said air plenum means and said jet plate means; each of said above recited components having an incremental twist therein to cause a can or like article to undergo reorientation as it passes through said air power conveyor segment.

10. An air power conveyor segment of the character defined in claim 9 wherein said air plenum means comprises a generally U-shaped elongated member having a pair of opposed flanges interconnected by a base portion being, said base portion supported by a plurality of spaced support angle members; said jet plate means also comprising a generally U-shaped elongated member received between said opposed flanges of said air plenum means and secured thereto, thereby forming said air plenum means.

11. An air power conveyor segment of the character defined in claim 10 wherein said U-shaped elongated member of said jet plate means further comprises a pair of opposed flanges interconnected by a base portion; said opposed flanges of said air plenum means and said jet plate means terminating at the same point.

12. An air power conveyor segment of the character defined in claim 11 wherein said friction reducing means is received over the ends of said opposed flanges of said air plenum means and said jet plate means to prevent marring or scratching of the cans or like articles passing through said conveyor segment.

13. An air power conveyor segment of the character defined in claim 9 wherein said jet plate means further includes a plurality of spaced louver notches for permitting exit of air pressure in said plenum to the vicinity of passing articles in the conveyor segment.

14. An air power conveyor segment of the character defined in claim 9 wherein said pressure supply means includes a centrifugal blower operably connected with air inlet tube means attached to said air plenum means.

15. An air power conveyor segment of the character defined in claim 9 wherein said pressure control means comprises a butterfly valve means operably connected to air plenum means.

16. An air power conveyor segment of the character defined in claim 15 wherein said butterfly valve means further includes a lever for manually positioning said butterfly valve.

17. An air power conveyor segment of the character defined in claim 16 wherein said butterfly valve means further includes an air inlet tube and a butterfly valve mounted therein; a shaft supporting said butterfly valve in said air inlet tube; said shaft projecting through said air inlet tube and operably connected to said lever whereby movement of said lever moves said butterfly valve accordingly.

18. An air power conveyor segment of the character defined in claim 17 wherein said butterfly valve means further includes locking means for locking said lever and said butterfly valve in its desired position.

19. An air power conveyor segment comprising upper and lower article supporting and guiding means;

said upper and lower article supporting and guiding means being positioned in opposing relationship such that an article, such as a can or the like, may be received therebetween, said upper and lower article supporting and guiding means being incrementally twisted at least a full ninety degrees over the entire longitudinal length thereof; each of said upper and lower article supporting and guiding means being provided with plenum chamber means and jet plate means; said air power conveyor segment further including air pressurizing means and air pressure control means for pressurizing and controlling the flow of air to said plenum chamber means and said jet plate means; and friction reducing means operatively connected to said plenum chamber means and said jet plate means whereby air exiting from said jet plate means and said friction reducing means cooperate to rapidly and almost frictionlessly move said article being conveyed at a high rate of speed without jamming.

20. An air power conveyor segment of the character defined in claim 19 wherein said plenum chamber means comprises a U-shaped longitudinal member receiving pressurized air from said pressurizing means.

21. An air power conveyor segment of the character defined in claim 20 wherein said jet plate means comprises a U-shaped channel member and is received in said U-shaped longitudinal member of said plenum chamber means.

22. An air power conveyor segment of the character defined in claim 19 wherein said air pressure control means comprises an air inlet tube with butterfly valve means mounted therein to control the flow of air therethrough.

23. An air power conveyor segment of the character defined in claim 19 wherein said pressurizing means comprises a centrifugal blower operably connected to said plenum chamber means.

24. An air power conveyor segment of the character defined in claim 19 wherein said friction reducing means comprises a plurality of friction reducing strips; each of said strips covering the flange portions of said plenum chamber means and said jet plate means whereby said articles passing through said conveyor segment contact said friction reducing strips thereby preventing scratches on said articles being conveyed and assisting in the feed of said article therethrough.

25. An air power conveyor segment of the character described in claim 19 wherein said jet plate means includes a plurality of centrally located louver notches whereby pressurized air is discharged at the top and bottom of said articles being transported therethrough to provide a cushion of air which moves said articles therealong.

26. An air power conveyor segment of the character defined in claim 9 wherein said upper and lower article supporting and guiding means includes adjustment means whereby articles of different sizes can be accommodated by said air power conveyor segment.

27. An air power conveyor segment of the character defined in claim 26 wherein said adjustment means is set at a distance of five inches to accommodate the conveyance of a twelve ounce can.

28. An air power conveyor segment of the character defined in claim 26 wherein said adjustment means is set at a distance of six and seven sixteenth inches to accommodate the conveyance of a sixteen ounce can.

29. An air power conveyor segment of the character defined in claim 2 wherein said adjustment means is set at a distance of five inches to accommodate the conveyance of a twelve ounce can.

30. An air power conveyor segment of the character defined in claim 2 wherein said adjustment means is set at a distance of six and seven sixteenth inches to accommodate the conveyance of a sixteen ounce can.

31. An air power conveyor segment of the character defined in claim 19 wherein said upper and lower article supporting and guiding means includes adjustment means whereby articles of different sizes can be accommodated by said air power conveyor segment.

32. An air power conveyor segment of the character defined in claim 31 wherein said adjustment means is set at a distance of five inches to accommodate the conveyance of a twelve ounce can.

33. An air power conveyor segment of the character defined in claim 31 wherein said adjustment means is set at a distance of six and seven sixteenth inches to accommodate the conveyance of a sixteen ounce can.

34. An air power conveyor segment of the character defined in claim 9 wherein said reorientation is in the range of one to ninety degrees.

35. An air power conveyor segment of the character defined in claim 9 wherein said reorientation is ninety degrees.

36. An air power conveyor segment for feeding articles along a path, said path being defined by first and second opposite sides and by third and fourth opposite sides extending between said first and second sides of said path, comprising first and second U-shaped channel means, each having an incremental twist therein to cause articles to undergo reorientation as they pass along said path through said air power conveyor segment, said first and second U-shaped channel means being located on said first and second opposite sides of said path respectively, said opposite sides having an incremental twist corresponding to said incremental twist of said first and second U-shaped channel means respectively, each of said U-shaped channel means comprising plenum means including an inner wall extending along and facing said path and a pair of spaced parallel flanges extending along said path from said inner wall, a plurality of openings extending along said path in each of said inner walls between said pair of flanges for directing air from the respective plenum means into said path in a generally downstream direction, said first and second U-shaped channel means, being spaced from each other on said respective first and second opposite sides of said path such that a continuous opening, having an incremental twist corresponding to said incremental twist of said first and second U-shaped channel means, is provided along each of said third and fourth opposite sides of said path between the free edges of two of said flanges, one extending from each of said inner walls, and means connected to each of said plenum mean for supplying pressurized air to each of said plenum means, whereby pressurized air in said plenum means is directed through said openings to pressurize said U-shaped channel means and substantially suspend said articles with said air while said articles are propelled downstream along said path, while being simultaneously reoriented, between said U-shaped channel means by said pressurized air.

37. An air power conveyor segment for feeding articles along a path, said path being defined by first and second opposite sides and by third and fourth opposite sides extending between said first and second sides of said path, said articles having a predetermined length as measured along their longitudinal axis and a predetermined width as measured along an axis perpendicular to said longitudinal axis, comprising first and second U-shaped channel means, each having an incremental twist therein to cause articles to undergo reorientation as they pass along said path through said air power conveyor segment, said first and second U-shaped channel means being located on said first and second opposite sides of said path respectively, said opposite sides having an incremental twist corresponding to said incremental twist of said first and second U-shaped channel means respectively, each of said U-shaped channel means comprising plenum means including an inner wall extending along and facing said path and a pair of spaced parallel flanges extending along said path from said inner wall, the edge of each of said flanges opposite said respective inner wall being free and the distance between said inner walls being sufficient to accommodate said predetermined length of said articles, a plurality of openings extending along said path in each of said inner walls between said pairs of flanges for directing air from the respective plenum means into said path in a generally downstream direction, said first and second U-shaped channel means being spaced from each other on said respective first and second opposite sides of said path such that a continuous opening, having an incremental twist corresponding to said incremental twist of said first and second U-shaped channel means, is provided along each of said third and fourth opposite sides of said path between said free edges of two of said flanges, one extending from each of said inner walls, the width of each of said continuous openings as measured between said free edges of two of said flanges being greater than said predetermined width of said articles, and means connected to each of said plenum means for supplying pressurized air to each of said plenum means, whereby pressurized air to said plenum means is directed through said openings to pressurize said U-shaped channel means and substantially suspend said articles with said air while said articles are propelled downstream along said path, while being simultaneously reoriented, between said U-shaped channel means by said pressurized air, and whereby a container misaligned and not oriented with its longitudinal axis substantially perpendicular to said path will fall through one of said continuous openings.

38. An air power conveyor segment for feeding articles along a path, said path being defined by first and second opposite sides and by third and fourth opposite sides extending between said first and second sides of said path, comprising first and second U-shaped channel means, each having an incremental twist therein to cause articles to undergo reorientation as they pass along said path through said air power conveyor segment, said first and second U-shaped channel means being located on said first and second opposite sides of said path respectively, said opposite sides having an incremental twist corresponding to said incremental twist of said first and second U-shaped channel means respectively, each of said U-shaped channel means comprising plenum means including an inner wall extending along and facing said path and a pair of spaced parallel flanges extending along said path from said inner wall, the edge of each of said flanges opposite said respective inner wall being free, a plurality of openings extending along said path in each of said inner walls between said pair of flanges for directing air from the respective plenum means into said path in a generally downstream, said first and second U-shaped channel means being spaced from each other on said respective first and second opposite sides of said path such that a continuous opening, having an incremental twist corresponding to said incremental twist of said first and second U-shaped channel means, is provided along each of said third and fourth opposite sides of said path between said free edges of two of said flanges, one extending from each of said inner walls, adjustable means supporting at least one of said U-shaped channel means such that said at least one U-shaped channel means may be moved towards and away from the other of said U-shaped channel means to permit passage of articles of different lengths between said U-shaped channel means, and means connected to each of said plenum means for supplying pressurized air to each of said plenum means, whereby pressurized air in said plenum means is directed through said openings to pressurize said U-shaped channel means and substantially suspend said articles with said air while said articles are propelled downstream along said path, while beng simultaneously reoriented, between said U-shaped channel means by said pressurized air.

39. An air power conveyor segment for feeding articles along a path, said path being defined by first and second opposite sides and by third and fourth opposite sides extending between said first and second sides of said path, comprising first and second U-shaped channel means, each having an incremental twist therein to cause articles to undergo reorientation as they pass along said path through said air power conveyor segment, said first and second U-shaped channel means being located on said first an second opposite sides of said path respectively, said opposite sides having an incremental twist corresponding to said incremental twist of said first and second U-shaped channel means respectively, each of said U-shaped channel means comprising plenum means including an inner wall extending along and facing said path and a pair of spaced parallel flanges extending along said path from said inner wall, the edge of each of said flanges opposite said respective inner wall being free, a plurality of openings extending along said path in each of said inner walls between said pair of flanges and hood means disposed on the surface of each of said inner walls opposite said path at each of said openings, each of said hood means having an inlet in the upstream side thereof for directing air from the respective plenum means through said inlets, hood means and openings into said path in a generally downstream direction, said first and second U-shaped channel means being spaced from each other on said respective first and second opposite sides of said path such that a continuous opening, having an incremental twist corresponding to said incremental twist of said first and second U-shaped channel means, is provided along each of said third and fourth opposite sides of said path between said free edges of two of said flanges, one extending from each of said inner walls, and means connected to each of said plenum means for supplying pressurized air to each of said plenum means, whereby pressurized air in said plenum means is directed through said openings to pressurize said U-shaped channel means and substantially suspend said articles with said air while said articles are propelled downstream along said path, while being simultaneously reoriented, between said U-shaped channel means by said pressurized air.

40. Conveying apparatus for conveying hollow articles along a path to an article-processing apparatus, comprising means defining first and second plenums located on opposite sides of said path and spaced form each other, each of said plenums having an inner wall facing said path and a pair of flanges extending from spaced locations on said wall to define a U-shaped channel having an open side facing the open side of the U-shaped channel of the opposite plenum with respective flanges of said plenums opposite each other, each of said walls having fluid-directing openings therein directed generally towards said processing apparatus;

said respective flanges of said plenums being spaced from each other to define exit slots between said flanges;

said plenum and U-shaped channels being configured to produce a twist in said path so that said articles moving along said path while retained between said U-shaped channels are reoriented at least 90° while moving along said path; and a pressurized fluid source and conduit means connecting said source to each of said plenums for supplying pressurized fluid to said plenums which fluid flows through said openings in said walls to pressurize said U-shaped channels and substantially suspend said articles in said fluid while being positively moved towards said processing apparatus to thereby increase the production speed of said processing apparatus.

41. Conveying apparatus for serially feeding containers along a path to a container-processing apparatus, comprising means defining first and second plenums located on opposite sides of said path and spaced from each other, each of said plenums having an inner wall facing said path and having fluid-directing openings directed generally towards said processing apparatus, each inner wall having a pair of flanges extending therefrom to define an open chamber whereby open chambers formed by the inner walls and pairs of flanges are located on opposite sides of said path for supporting and guiding said containers as they pass along said path;

said plenums, including said inner walls and pairs of flanges, being configured to turn said containers from a vertical orientation to a horizontal orientation as said containers pass along said path;

pressurized fluid means connected to said plenums for pressurizing said plenums to produce air flow through said openings in said walls and pressurize said chambers so that said containers are substantially suspended by said fluid while being moved along said path by said fluid and turned from a vertical orientation to a horizontal orientation.

* * * * *